United States Patent
Candy

(10) Patent No.: US 11,658,416 B2
(45) Date of Patent: May 23, 2023

(54) ANTENNA OF A METAL DETECTOR

(71) Applicant: Minelab Electronics Pty. Limited, Mawson Lakes (AU)

(72) Inventor: Bruce Halcro Candy, Mawson Lakes (AU)

(73) Assignee: Minelab Electronics Pty. Limited, Mawson Lakes (AU)

( * ) Notice: Subject to any disclaimer, the term of this patent is extended or adjusted under 35 U.S.C. 154(b) by 82 days.

(21) Appl. No.: 17/186,213

(22) Filed: Feb. 26, 2021

(65) Prior Publication Data

US 2021/0273335 A1 Sep. 2, 2021

(30) Foreign Application Priority Data

Feb. 28, 2020 (AU) ................ 2020900585

(51) Int. Cl.
- *H01Q 7/00* (2006.01)
- *H01Q 1/24* (2006.01)
- *G01V 3/10* (2006.01)
- *G01V 3/165* (2006.01)

(52) U.S. Cl.
CPC ............ *H01Q 7/00* (2013.01); *G01V 3/10* (2013.01); *G01V 3/104* (2013.01); *G01V 3/165* (2013.01); *H01Q 1/24* (2013.01)

(58) Field of Classification Search
CPC .......... H01Q 7/00; H01Q 1/24; G01V 3/104; G01V 3/165; G01V 3/10
USPC ........................................................ 343/702
See application file for complete search history.

(56) References Cited

U.S. PATENT DOCUMENTS

| | | | |
|---|---|---|---|
| 3,588,687 A | 6/1971 | Kohler | |
| 4,345,208 A | 8/1982 | Wilson | |
| 5,245,307 A * | 9/1993 | Klaus | G01V 3/107 336/200 |
| 5,581,248 A * | 12/1996 | Spillman, Jr. | G01D 5/48 340/870.37 |
| 7,649,356 B2 * | 1/2010 | Earle | G01V 3/15 324/67 |
| 9,733,353 B1 | 8/2017 | Carlson et al. | |
| 10,145,660 B1 | 12/2018 | Fluhler et al. | |
| 2011/0181276 A1 * | 7/2011 | Moskalenko | G01N 33/02 324/240 |
| 2011/0234214 A1 * | 9/2011 | Jones | G01V 3/107 324/239 |

FOREIGN PATENT DOCUMENTS

AU 2013101681 A4 3/2014

* cited by examiner

*Primary Examiner* — Hai V Tran
(74) *Attorney, Agent, or Firm* — The Webb Law Firm

(57) ABSTRACT

An antenna of a handheld metal detector for detecting a target in a soil, the antenna including a housing including a bottom plane for facing the soil; two lateral sides; a front side; and a rear side; wherein the lateral sides, the front side and rear side are with respect to a user of the handheld metal detector holding and operating the handheld metal detector to detect the target in the soil; and at least one winding within the housing. A mean distance of conductors of the at least one winding near at least one of the two lateral sides of the housing is closer to the bottom plane than a mean distance of conductors of the at least one winding near at least one of the front side and rear side of the housing.

7 Claims, 4 Drawing Sheets

ANTENNA OF A METAL DETECTOR

CROSS-REFERENCE TO RELATED APPLICATION

This application claims priority to Australian Patent Application No. 2020900585 filed Feb. 28, 2020, the disclosure of which is hereby incorporated by reference in its entirety.

BACKGROUND OF THE INVENTION

Field of the Invention

The present disclosure relates to an antenna of a metal detector.

Description of Related Art

A typical metal detector comprises a magnetic field antenna which includes a magnetic field transmitter and a magnetic field receiver, to transmit a transmit magnetic field and to receive a receive magnetic field, respectively. Within the hand-held metal detector industry, magnetic field antennae, known as "coils", mostly consist of inductive coil winding(s) that act to transmit magnetic fields and to receive changing magnetic fields. The magnetic field transmitter and a magnetic field receiver may be the same entity, for example they may be provided by a dual-purpose so called "mono-loop" coil winding. Most coils either have circular or elliptically shaped planar housings that are wide and long compared to their height. That is, the planar housing is swept side-to-side parallel to the soil surface and just above the soil surface when buried targets are being sought by an operator. Further, most coil windings are of a compact cross-sectional winding shape, typically circular or rectangular in cross-sectional shape.

SUMMARY OF THE INVENTION

According to a first aspect of the present disclosure, there is provided an antenna of a handheld metal detector for detecting a target in a soil, the antenna comprising: a housing comprising a bottom plane for facing the soil; two lateral sides; a front side; and a rear side; wherein the lateral sides, the front side and rear side are with respect to a user of the handheld metal detector holding and operating the handheld metal detector to detect the target in the soil; and at least one winding within the housing, wherein a mean distance of conductors of the at least one winding near at least one of the two lateral sides of the housing is closer to the bottom plane than a mean distance of conductors of the at least one winding near at least one of the front side and rear side of the housing.

In one form, mean distances of conductors of the at least one winding near both of the two lateral sides of the housing are closer to the bottom plane than mean distances of conductors of the at least one winding near both the front side and rear side of the housing.

In one form, the at least one winding has an elongated cross-sectional profile.

In one form, the elongated cross-sectional profile extends closer to a direction parallel to the bottom plane near at least one of the two lateral sides of the housing than near at least one of the front side and rear side of the housing; and the elongated cross-sectional profile extends closer to a direction orthogonal to the bottom plane near at least one of the front side and rear side of the housing than near at least one of the two lateral sides of the housing.

In one form, the elongated cross-sectional profile near at least one of the two lateral sides of the housing is perpendicular to the elongated cross-sectional profile near at least one of the front side and rear side of the housing.

In one form, the elongated cross-sectional profile extends in a direction parallel to the bottom plane near at least one of the two lateral sides of the housing and near at least one of the front side and rear side of the housing.

According to another aspect of the present disclosure, there is provided a metal detector comprising the antenna of the first aspect.

According to another aspect of the present disclosure, there is provided a transmitter for a handheld metal detector, comprising: a coil with at least one winding housed within a coil housing; wherein a mean distance of conductors of the winding is closer to a bottom of the coil housing near at least one of lateral sides of the coil housing, than a mean distance of the conductors of the winding near a front and/or a rear of the coil housing where the conductors of the winding are on average further away from the bottom of the coil housing; wherein the lateral sides, the front, the rear and the bottom refer to an intended use of the coil for searching targets in soils, such that the lateral sides refer to coil housing perimeter regions more normal to a dominant intended motion of the coil housing relative to the soils, and the front and the rear refer to coil housing perimeter regions more parallel to the dominant intended motion of the coil housing relative to the soils, and the bottom refers to a part of the coil housing that is closest to a surface of the soils.

BRIEF DESCRIPTION OF DRAWINGS

Embodiments of the present disclosure will be discussed with reference to the accompanying drawings wherein.

DESCRIPTION OF THE INVENTION

Figure 1A:
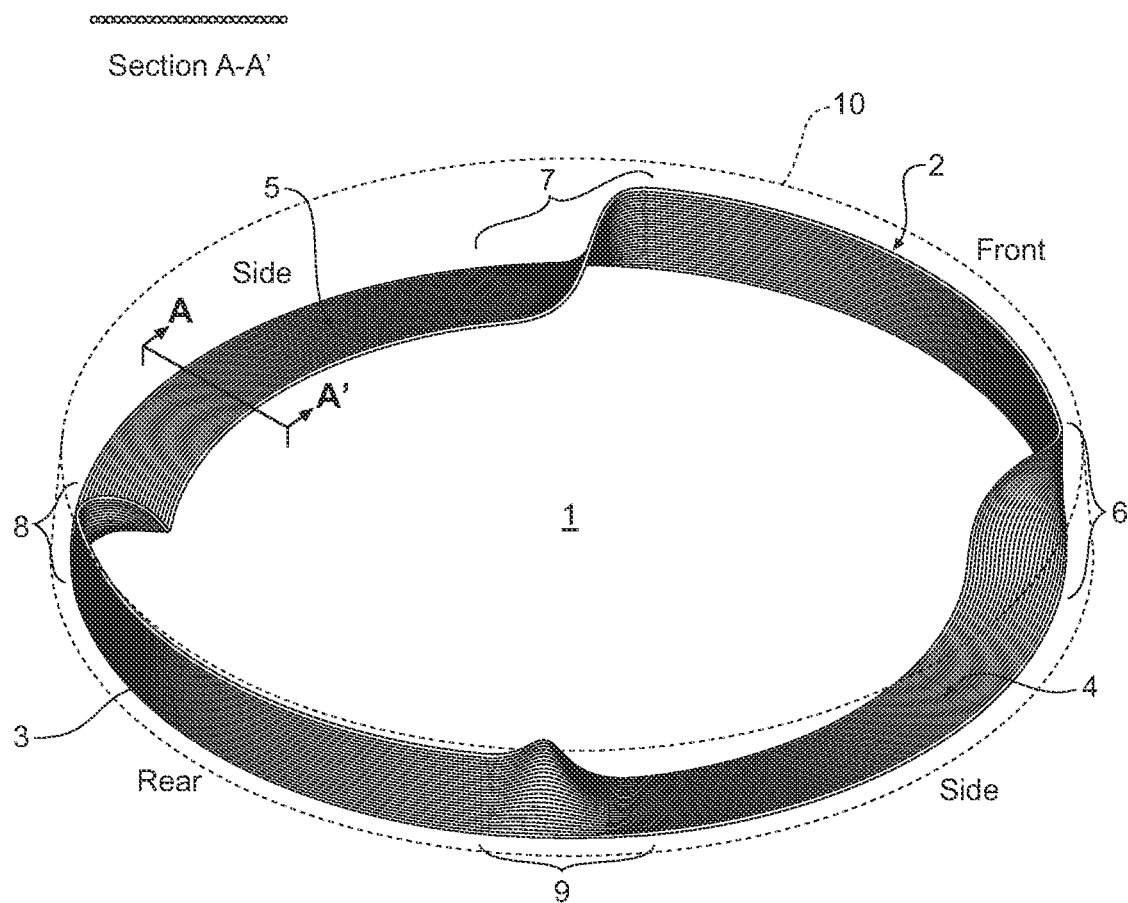
FIG. 1A shows an exemplary embodiment of the present disclosure.

In this disclosure, the term "winding" refers a wound inductance consisting of multiple conductive wire turns. A mono-loop coil winding comprises a single winding which usually comprises multiple turns of conductive wires. A double-D coil comprises two partially over-lapping windings, each comprises turns of conductive wires. The cross-sectional winding profile of most metal detector windings is usually compactly bundled, for example, the cross-sectional shape may be approximately square, or circular, or rectangular.

However, it is discovered that some specialised coils of metal detectors, designed fit for purpose to find gold in gold fields, have windings that are not compact in cross-sectional shape, but arranged in planar spirals with each of the successive turns being usually close to one another, typically touching one another, but in rare instances, spread apart. Windings are typically housed close to the bottom of the planar coil housing, and, spiralled coil windings are known to have their long cross-sectional axis close to coplanar with the coil housing bottom housing face, and are approximately constrained to one plane.

These so called spiral "flat-wound" coils have three advantages for detecting small shallow targets compared to a compact bundled winding:
  a) The field generated from each turn passes closer to the target as the coil is swept over the target, and hence each specific turn for the spiral coil both irradiates the target with a greater field intensity and likewise receives the decaying eddy currents in the metal target with greater sensitivity compared to each specific turn of the compact winding on average;
  b) As the coil is swept past the target, the transmit field and receiving winding sensitivity from spiral winding are laterally broader, and hence improves electronics signal-to-noise ratio; that is, the signal from the shallow target is within the effective volume of transmitted stronger field for a longer period compared to that of a compact winding, and similarly the target is within the more sensitive areas of a spiral receive winding for longer than a compact receive winding; and
  c) As the total volume integrated 3D (magnetic field magnitude)$^2$ for a given inductance and transmit current ($\frac{1}{2}\iiint B^2 dV$), the same for all coils regardless of winding shape (in the absence of permeable material), more of the strong field of compact traditional mono-loop bundle resides within or close to the perimeter of the actual bundled winding than does the field of the planar spiral winding. Hence the spiral winding has the advantage of irradiating more of its field out into the interrogated environment than the compact traditional mono-loop winding bundle, thus putting the spiral winding's field to better use for target detection.

However, it was discovered that flat-wound coils have three disadvantages, especially for detecting deeper targets compared to a compact winding:
  a) The greater integrated field energy transmitted into the soils causes so called VRM (Viscous Remnant Magnetism) "saturation". This is manifest as a non-cancelled ground balanced spurious signal when the coil is moved within a centimeter or so of the soil surface for some, but not all, soils;
  b) The inductance of both the receive and transmit inductive winding (or alternatively a mono-loop single winding), vary more when the said winding is closer to magnetic soils that are often associated with gold fields, than a compact winding, due to the stronger winding-to-soil coupling of the flat-wound winding. This causes the (critically) damped decay rates to change and this in turn may be detected by the electronics and manifest as spurious signals; and
  c) The spiral winding are more sensitive to local surface soil VRM inhomogeneities, and this too causes spurious signals.

In general, the advantages of spiral winding outweighs the disadvantages in soils that have relatively low VRM mineralization for detecting shallow targets, but vice versa in soils that have relatively high mineralization. This may result in relatively poor behaviour in some soils when seeking deeply buried targets, especially when used in soils that are magnetically inhomogeneous and prone to VRM saturation.

This disclosure provides an alternative form of a winding or a winding profile within a metal detector coil that has advantages of spiral winding and reduced level of disadvantages of spiral winding.

The new form is based on the following. If any or all of these said three disadvantages (saturation, soil VRM inhomogeneities, modulation of critical damping) cause spurious interference signals from flat-wound coils are in effect defined as "uncancelled soil noise", then the signal from a metal target to uncancelled-soil-noise ratio in essence mostly defines the relative capability of a coil, for given size/enclosed winding area. Further, most targets at challenging detection depths are found best when the coil passes centrally above the target, whereas the target signal for a coil's front edge or rear edge passing over a target typically will give a weaker target signal. In contrast though, for a typically any cross-sectional shape planar winding (parallel to the plane of the coil housing), the front, and rear, and each of the lateral sides, each typically produce the same soil signal contributions (per unit length). Thus, the front and rear areas of the planar mono-loop winding add the same soil signal as the sides, but relatively, a mono-loop's winding lateral sides, and center, are more responsible for the target signal as the coil passes centrally above the target for the best target signal when the coil is swung "side-to-side" centrally over the target. Hence, there is advantage in keeping the lateral sides of a winding close to the bottom of a coil housing, but not the front and rear of the winding.

In a broad form, there is provided an antenna of a handheld metal detector for detecting a target in a soil, the antenna comprising: a housing comprising a bottom plane for facing the soil; two lateral sides; a front side; and a rear side; wherein the lateral sides, the front side and rear side are with respect to a user of the handheld metal detector holding and operating the handheld metal detector to detect the target in the soil; and at least one winding within the housing, wherein a mean distance of conductors of the at least one winding near at least one of the two lateral sides of the housing is closer to the bottom plane than a mean distance of conductors of the at least one winding near at least one of the front side and rear side of the housing.

In another broad form, there is provided a transmitter of a handheld metal detector for detecting a target in a soil, the antenna comprising: a housing comprising a bottom plane for facing the soil; two lateral sides; a front side; and a rear side; wherein the lateral sides, the front side and rear side are with respect to a user of the handheld metal detector holding and operating the handheld metal detector to detect the target; and at least one winding within the housing, wherein a mean distance of conductors of the at least one winding near at least one of the two lateral sides of the housing is closer to the bottom plane than a mean distance of conductors of the at least one winding near at least one of the front side and rear side of the housing.

The terms "lateral sides", "front side", "rear side" and "bottom plane" refer to an intended typical use of the said coil for searching targets in soils, such that the "lateral sides" refer to coil housing perimeter regions more normal to the dominant intended motion of the coil housing relative to the soil, and the "front" and "rear" refer to coil housing perimeter regions more parallel to the dominant intended motion of the coil housing relative to the soil, and "bottom" refers to the part of the coil's housing that is typically meant to be operated closest to the soil surface. In simple term, the terms "lateral sides", "front side", "rear side" of the housing of the transmitter of a metal detector are to be understood based on the perspective of the operator when the operator is holding the hand-held metal detector in front with the arm holding the metal detector shaft extending forward away from the body.

In the case of vehicle-mounted metal detector antenna, the intended coil housing movement is "forward" rather than side-to-side in the direction of the vehicle's travel.

FIG. 1A shows an exemplary embodiment of the present disclosure, and in this example shows a circular external perimeter winding 1, but this may be any shape, such as rectangular, square or elliptical for example, wound onto a coil chassis or coil's bottom base former (a guide structure to form the coil) within housing 10. The front side 2 of the coil perimeter has a vertically orientated monolayer section of its winding occupying approximate a quarter or a bit less than a quarter of the coil's circumference (if viewed from the top, approximate a quarter or a bit less than a quarter of the coil at the front is with the winding being vertical with respect to the base). The front side 2 is perpendicular to the coil bottom plane, and likewise the rear side 3 has a vertically orientated monolayer section of its winding occupying approximate a quarter or a bit less than a quarter of the coil's circumference. Each of the lateral sides has a horizontally orientated monolayer section of its winding occupying approximate a quarter or a bit less than a quarter each of the coil's circumference, on the right-hand side 4, the horizontal winding section, and left-hand side 5 for the left, when viewed from the rear.

Between the said horizontally orientated monolayer sections of the winding at the left and right sides 4 and 5, and vertically orientated monolayer sections of the winding at front side 2 and rear side 3 are transitions sections 6, 7, 8 and 9 that are relatively short in length. Whilst this figure shows a monolayer winding, alternatively it may consist of two layers or more, so long as the cross-sectional profile is longer along one axis compared to another, such that the longer cross-sectional profile length defines the terms "horizontal" and "vertical" in the above description. The particular ratios of winding sectional length are not constrained to "approximate a quarter or a bit less than a quarter" each, so long as the general concept of more horizontal on the sides and more vertical on the front and rear holds. For example, the front side may occupy 20%, rear side 14%, and lateral sides 33% each (a rough approximation including transitions). In another example, the front side may occupy 20%, rear 20% and lateral sides 30% each (a rough approximation including transitions). The front and rear sides may of the same proportion, and may not. The two lateral sides are often of the same proportion but this is not a necessity.

Figure 1B:
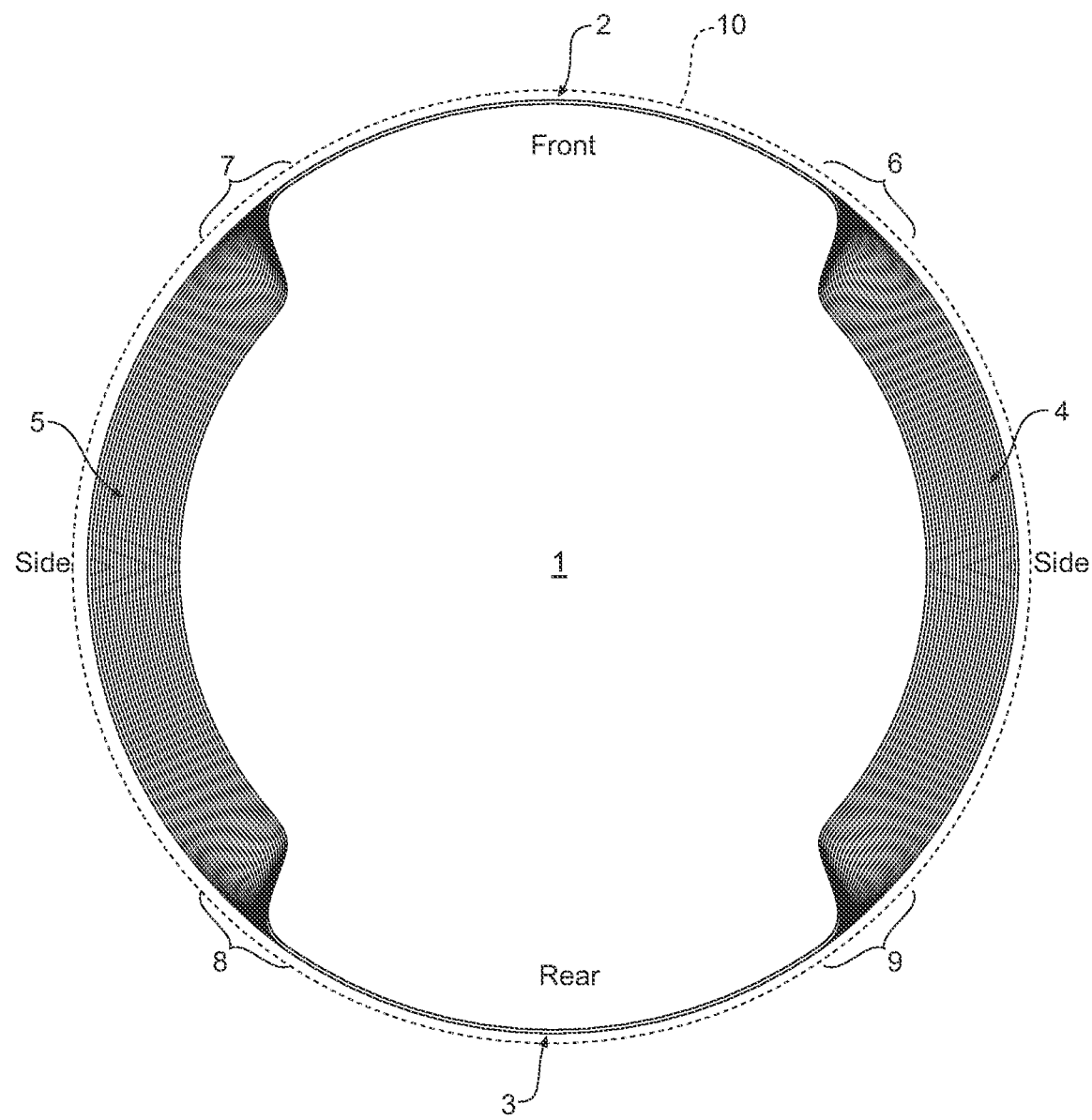
FIG. 1B shows a top view of the embodiment of FIG. 1A.

FIG. 1B depicts the top view of the winding of 1A. It can be seen that the winding at the front side 2 and rear side 3 are perpendicular to the bottom plane, and that the winding at the two lateral sides are parallel with the bottom plane. Transitions sections 6, 7, 8 and 9 are relatively short in length.

Figure 2A:
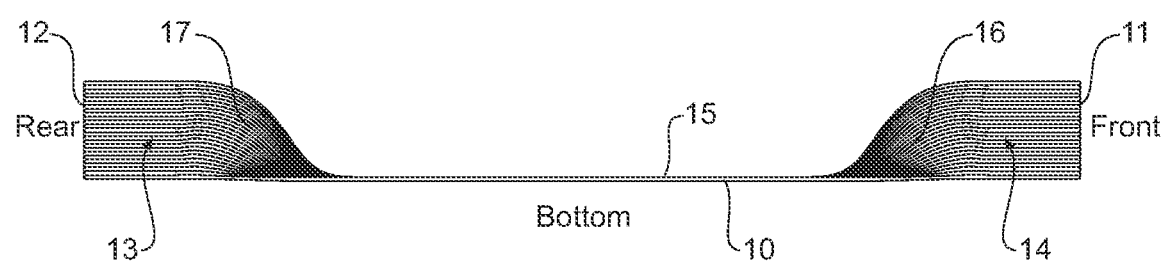
FIG. 2A shows a side view of the embodiment of FIG. 1A.
Figure 2B:
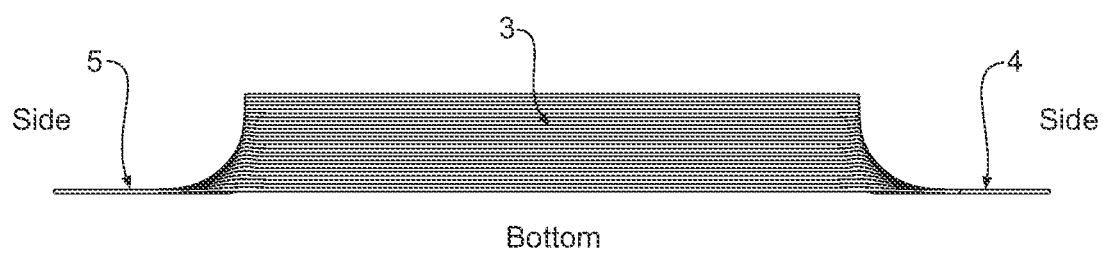
FIG. 2B shows a front or rear view of the embodiment of FIG. 1A.

FIG. 2A depicts a view from a lateral side of the winding of FIG. 1A while FIG. 2B depicts a view from a front or rear side of the winding of FIG. 1A. As can be observed, at the front side and rear side of the winding, the conductive wires are arranged to form a vertical plane 11, 12. At the two lateral sides, the conductive wires are arranged horizontally to form a horizontal plane of wires 15 parallel with the bottom plane 10. There are transitions between the vertically arranged wires and the horizontally arranged wires. In this example, vertical plane of wires 13 or 14 transit 17 or 16 to horizontal plane of wires 15.

Further, the winding do not have to be exactly horizontal on the sides or exactly vertical at the front or rear, so long as they are closer to horizontal than vertical on the sides, and closer to vertical than horizontal at the front and rear. For example, the winding may be similar in shape to a cycling velodrome. The cross-sectional plane of the winding may be curved (such as in the case of a velodrome) or may be straight (such as in the case shown in FIG. 1A).

In another form, a plane of the winding at the front side is extending upward away from the center at an angle between 75 to 90 degrees with respect to a horizontal plane.

In one form, there is provided a transmitter for a metal detector, comprising: a coil with at least one winding housed within a coil housing, wherein at least most of a cross-sectional winding profile of the winding includes a longer cross-sectional axis that is substantially greater in relative width than a shorter cross-sectional axis, and wherein the orientation of the longer cross-sectional axis of the winding is more approximately parallel to a plane of a coil housing along at least one of the sides of the housing, and the orientation longer cross-sectional axis of the winding is more approximately normal to the plane of the coil housing along a front and/or rear of the coil housing.

Figure 3:
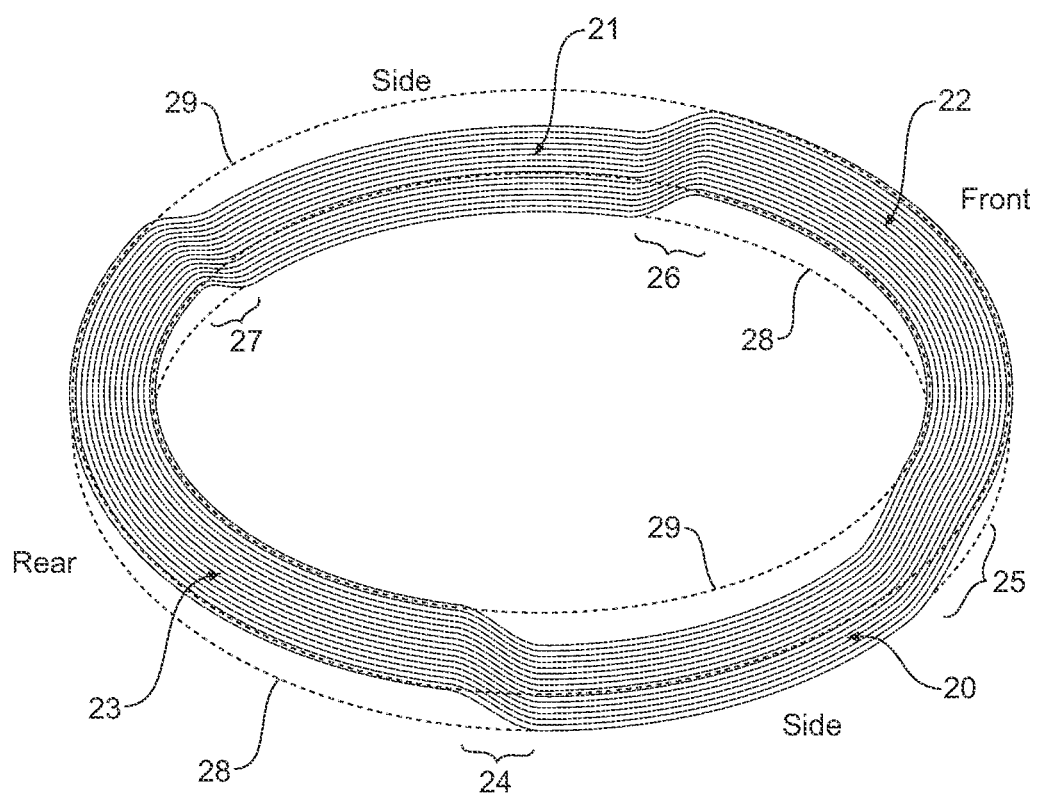
FIG. 3 shows another exemplary embodiment of the present disclosure.

FIG. 3 shows another exemplary embodiment of the present disclosure. This example shows a circular external perimeter winding, but this may be any shape, such as rectangular, square or elliptical for example. The winding on each side of the coil perimeter has a section of its winding, both winding section 20 on the right-hand side, and winding section 21 on the left-hand side, for approximate a quarter or a bit less than a quarter of the coil circumference each, closer to the bottom plane of the coil, which would be closer to the soil surface when operated as intended, than the front and rear sections of the coil perimeter winding, which are relatively raised higher; being winding section 22 at the front and winding section 23 at the rear. Between the said lower winding sections 20 and 21, and raised higher winding sections 22 and 23, are transitions sections 24, 25, 26 and 27 that are relatively short in length. Indicative lines 28 and 29 show two indicative planes of different levels. This arrangement also satisfies the principal requirement of the invention that the more useful sides of the coil winding at detecting shallow targets are closer to the soil than the less useful front and rear parts of the winding, which are less coupled into the surface of the soil and thus produce a lower soil signal contribution, and thus the coil has both a good capability at detecting shallow targets, but generates lower soil related spurious signal-levels because the front and rear are less coupled into the soil than the same sort of coil winding would have if the whole winding was coplanar and at the same relative level as the winding sections 20 and 21. The winding may have any cross-sectional shape whilst maintaining the general advantage. The particular ratios of winding sectional length are not constrained to "approximate a quarter or a bit less than a quarter" each, so long as the general concept of lower on the sides on average and higher on average on the front and rear holds.

Alternatively, the winding may be a combination of the features of FIG. 1A and FIG. 3.

At the time of writing, Litz wires would be the choice of wires in making coils described in this disclosure. The net conductive cross-sectional area of Litz wires may be chosen to produce a desired coil resistance. As an example, the total inductance may be in the vicinity of 300 µH, and DC resistance in the region of 0.4Ω. Such a prototype with a monolayer mono-loop winding, orientated vertically at the front and rear, and horizontally on the sides, has been tested successfully in the field, exhibiting a relatively better shallow target to uncancelled-soil-noise ratio than the extant art.

Functional antennae were prototyped based on FIG. 1A and FIG. 3. It was found that such antennae offer benefits over one or more of the disadvantages of a spiral coil mentioned previously.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement or any form of suggestion that such prior art forms part of the common general knowledge.

It will be appreciated by those skilled in the art that the invention is not restricted in its use to the particular application described. Neither is the present disclosure restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. An antenna of a handheld metal detector for detecting a target in a soil, the antenna comprising:
    a housing comprising a bottom plane for facing the soil; two lateral sides; a front side; and a rear side; wherein the lateral sides, the front side and rear side are with respect to a user of the handheld metal detector holding and operating the handheld metal detector to detect the target in the soil;
    at least one winding within the housing, wherein the at least one winding comprises multiple turns of conductors, the winding comprises four sections, a front section, a rear section, and two lateral sections corresponding to the two lateral sides, the front side, and the rear side of the housing; and
    at least 20% of an outer perimeter of the winding in the front section, or at least 20% of an outer perimeter of the winding in the rear section, or both, are further away from the bottom plane compared to the two lateral sections.

2. The antenna of claim 1, wherein the at least one winding has an elongated cross-sectional profile.

3. The antenna of claim 2, wherein the elongated cross-sectional profile extends closer to a direction parallel to the bottom plane near at least one of the two lateral sides of the housing than near at least one of the front side and rear side of the housing; and the elongated cross-sectional profile extends closer to a direction orthogonal to the bottom plane near at least one of the front side and rear side of the housing than near at least one of the two lateral sides of the housing.

4. The antenna of claim 3, wherein the elongated cross-sectional profile near at least one of the two lateral sides of the housing is perpendicular to the elongated cross-sectional profile near at least one of the front side and rear side of the housing.

5. The antenna of claim 2, wherein the elongated cross-sectional profile extends in a direction parallel to the bottom plane near at least one of the two lateral sides of the housing and near at least one of the front side and rear side of the housing.

6. The antenna of claim 1, wherein the antenna is a transmitter or a receiver, or both, of the handheld metal detector.

7. A handheld metal detector comprising the antenna of claim 1.

* * * * *